(12) United States Patent
Bush et al.

(10) Patent No.: US 8,379,967 B1
(45) Date of Patent: Feb. 19, 2013

(54) SWARM CONTROL SYSTEMS AND METHODS

(75) Inventors: Stephen Francis Bush, Latham, NY (US); John Hershey, Ballston Lake, NY (US); Ralph Thomas Hoctor, Saratoga Springs, NY (US); Glen William Brooksby, Glenville, NY (US); Ambalangoda Gurunnanselage Amitha Perera, Clifton Park, NY (US); Anthony James Hoogs, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1111 days.

(21) Appl. No.: 12/328,744

(22) Filed: Dec. 4, 2008

(51) Int. Cl.
 *G05B 19/418* (2006.01)
(52) U.S. Cl. ........................................ 382/153; 700/248
(58) Field of Classification Search .................. 382/153; 901/1; 700/9, 28, 245, 247, 248
See application file for complete search history.

(56) References Cited

U.S. PATENT DOCUMENTS

| | | | |
|---|---|---|---|
| 6,687,571 B1* | 2/2004 | Byrne et al. | 700/245 |
| 2003/0176947 A1* | 9/2003 | Estkowski | 700/245 |

* cited by examiner

*Primary Examiner* — Andrew W Johns
(74) *Attorney, Agent, or Firm* — McDermott Will & Emery LLP (57) ABSTRACT

A system for controlling a swarm that includes a plurality of autonomous objects may include a processing system and a controller. The processing system may compute the primitives to be applied to each pair of objects in the swarm, and may combine the primitives to generate higher-level primitives. The processing system may generate a graph of the computed primitives, and identify the cliques in the graph. The controller may cause the primitives to be applied between each pair of objects in the swarm, and cause each object to maximize its respective set of primitives so as to induce the desired group behavior. The controller may detect the desired group behavior in the swarm by monitoring the primitives computed by the processing system and the cliques identified by the processing system.

39 Claims, 6 Drawing Sheets

SWARM CONTROL SYSTEMS AND METHODS

BACKGROUND

A number of applications require that large numbers of autonomous units, which may be referred to as swarms or swarming systems, be controlled. As just one of many possible examples, a plurality of small autonomous units may have the capability of penetrating and sensing the integrity of mechanical devices. By way of example, an aircraft engine, turbine, or wind generator, may be non-destructively evaluated by many small robotic devices swarming through the interior searching for defects.

Swarms may be made up of a large number of simple entities that undergo local interactions, which may include interaction with the environment. In some applications, the autonomous objects or agents that make up a swarm may be assumed to be small, and to have limited processing capabilities. Simple, on-board processing procedures may therefore have to be adopted in order to control the autonomous agents in these applications.

It has been recognized that complex group behaviors may emerge in swarms, and that results may achieved as a group by combining microscopic behaviors of the individual entities that make up a swarm.

Controlling swarms is a complex activity. Systems and methods for efficient large-scale control of swarming systems remain a challenge.

SUMMARY

In the present disclosure, systems and methods for controlling swarms are described. In one embodiment of the present disclosure, a set of primitives that describe pairwise conditions or relationships between all the objects or agents in the swarm are used to define desired group behaviors. The desired group activity is modeled as a set of relational semantic predicates defining pairwise, local constraints between all object pairs participating in an activity. These constraints form a graph where objects are nodes and edges are the predicate values. Relational clustering may used to identify cliques, i.e. groups of objects for which the relational predicates are mutually true over time. Spectral graph analysis is used to identify approximate cliques corresponding to objects participating in an activity at a given time.

An alternating set of primitives may generate swarm actions during the action phase, followed by a collective sensing during the detection phase.

The basic primitives may be computed, then combined in order to compose higher-level primitives. The higher-level primitives may be used in an action phase, in order to induce a desired group behavior, and during a detection phase in order to detect or recognize the desired group behavior.

During the action phase, actions by the agents may be generated such that each agent attempts to maximize its set of primitives relative to all other agents. During the detection phase, a controller, which may include a sensing system, may determine the collective progress of the objects in the swarm towards achieving the higher level primitives.

BRIEF DESCRIPTION OF THE DRAWINGS

The figures depict one or more implementations in accord with the present concepts, by way of example only, not by way of limitations. The drawings disclose illustrative embodiments. They do not set forth all embodiments. Other embodiments may be used in addition or instead.

DETAILED DESCRIPTION

In the present disclosure, systems and methods are described for controlling swarms. A set of pairwise interactions between objects in a swarm are used to induce a desired group behavior, and also to detect or identify the desired group behavior.

In the present disclosure, the individual entities that make up or constitute a swarm are referred to as either agents or objects. The term "agent" and the term "object" thus have the same meaning, and are used interchangeably, in the present disclosure. Further, the term "swarm" and the term "swarming system" also have the same meaning, and are used interchangeably, in the present disclosure. Finally, the term "predicate" and the term "primitive" also have the same meaning, and are used interchangeably, in the present disclosure.

In overview, a system for controlling a swarm that includes a plurality N of autonomous objects may include a processing system and a controller. The processing system may compute one or more primitives to be applied to pairs of objects in the swarm, where each primitive is a local, pairwise relationship between two objects in the swarm. The processing system may then combine the primitives for multiple of the pairs of the objects in order to generate higher-level primitives that can result in a desired group behavior of the objects. As explained in further detail below, the processing system may generate a graph of the computed primitives, and identify one or more cliques in the graph.

The controller may cause the computed primitives to be applied between each pair of objects in the swarm, and may cause each object to maximize its respective set of primitives so as to induce the desired group behavior by the objects, the controller further configured to detect the desired group behavior in the swarm by monitoring the primitives computed by the processing system and the cliques identified by the processing system.

The processing system and the controller may implement the methods, systems, and algorithms described in the present disclosure, using computer software. The methods and systems in the present disclosure are not described with reference to any particular programming language. It will be appreciated that a variety of programming languages may be used to implement the teachings of the present disclosure. The processing system and the controller may be selectively configured and/or activated by a computer program stored therewithin. Such a computer program may be stored in any computer readable storage medium, including but not limited to, any type of disk including floppy disks, optical disks, CD-ROMs, and magnetic-optical disks, read-only memories (ROMs), random access memories (RAMs), erasable programmable read-only memories (EPROMs), electrically erasable programmable read-only memory (EEPROMs), magnetic or optical cards, or any type of media suitable for storing electronic instructions.

The methods, algorithms, and systems presented herein are not inherently related to any particular computer, processor or other apparatus. Various general purpose systems may be used with different computer programs in accordance with the teachings herein. Any of the methods, systems, and algorithms described in the present disclosure may be implemented in hard-wired circuitry, by programming a general purpose processor, a graphics processor, or by any combination of hardware and software.

The higher-level primitives may be used during an action phase to induce the desired group behavior, and during a detection phase to detect the desired group behavior. During the action phase, actions may be generated by the agents such that each agent attempts to maximize its set of primitives relative to all other agents. During the detection phase, a sensing system may determine the collective progress or collective signal towards achieving the said primitive. Such a collective signal may be sensed relative to specific spatial areas. Different primitives may be sensed and triggered in different areas. Swarm programming may thus consist of an alternating set of primitives, which may be wirelessly transmitted, that generate swarm actions during the action phase, followed by a collective sensing during the detection phase.

In one embodiment, at least some of the objects may include fixed implanted agents whose locations are known.

As one example, a desired group behavior may consist of "flow". Flow may be comprised of the primitives "near" and "same_direction". During the action phase, each swarm agent may maximize its weighted pair-wise combination of "near" and "same_direction," thereby causing the swarm to flow, i.e. engage in the desired group behavior. This may followed by a detection phase in which the collective "flow" signal reaches a desirable value, which may then trigger the next step of the swarm program.

Further details of the primitives, group activity modeling, and group activity detection, in accordance with one embodiment of the present disclosure, are provided below.

In one embodiment, the present disclosure addresses the problem of recognizing group activities or activities with an arbitrary, variable number of participants. This class of activities may include, but are not limited to: the formation and dispersal of crowds, formation of vehicle convoys, traffic flow, meetings, queues, and many others. The formulation described below is based on statistical clustering in the domain of the relational primitives. This formulation may allow an arbitrary number of elements to be considered.

Group activity model representation may involve a logical combination of semantic, spatio-temporal, relational predicates (or primitives) for the objects involved in the activity over some time window. The set of primitives may vary by domain. In one embodiment of the present disclosure that involves surveillance experiments, the primitives may include basic relational concepts such as close-to, moving-closer, next-to, facing-towards, etc., and their opposites.

Because each concept is relational, it may induce a graph on the objects in the scene at a given time. In this graph, a clique is a set of objects for which the relation holds between all pairs of objects. A set of primitives, evaluated at the same time for the same objects, induces a multi-graph with analogous cliques. If the predicates are continuously valued instead of binary, then the graph is weighted. Spectral clustering on the adjacency matrix of the graph may be used to find approximate cliques, which correspond to sets of objects participating in the modeled activity.

In one embodiment, a probabilistic mapping of cluster locations is used that is accumulated over time, so that locations with sufficient likelihood are determined to be instances of the activity.

The above-described activity representation is generic, so that any group activity is modeled by a set of pairwise relations or primitives. The number of participants is not fixed and can be arbitrarily large, although the number must be large enough to form a group (typically four). Participants in an activity may be segmented from non-participants, which enables detection in the presence of large numbers of clutter objects.

Semantic primitives are invariant with respect to the underlying activity. For instance, the activity of crowd formation involves a number of people coming together regardless of their absolute locations, individual trajectories, and sizes.

In one embodiment, group activity may be represented as follows. An activity model $A=(S, \{Q\}, N_T)$ consists of a set $S=\{S_k(\cdot,\cdot,t)\}_{k=1}^{N_S}$ of $N_S$ relational semantic predicates that are true for the objects $\{O\}$ participating in the activity, at all times t within a time interval defined by the relation $t=T-N_T, \ldots, T$:

$$S_k(O_i, O_j, t) = 1 \quad \forall S_k \in S$$
$$\forall O_i, O_j \in \{O\}$$
$$t = T - N_T, \ldots, T$$

In the above equation, T is the current time instant (frame). The time window $N_T$ is the number of video frames over which the evidence for the activity can be accumulated. The above formulation allows values as small as $N_T=1$, although in practice $N_T$ is usually tens of seconds. Predicate evaluations over the previous $N_T$ frames from the current frame are combined as described below.

This basic model can represent interesting activities through the nature of emergent behaviors. Complex group behavior may emerge from combining simple predicate values from multiple object pairs over time.

Figure 1:
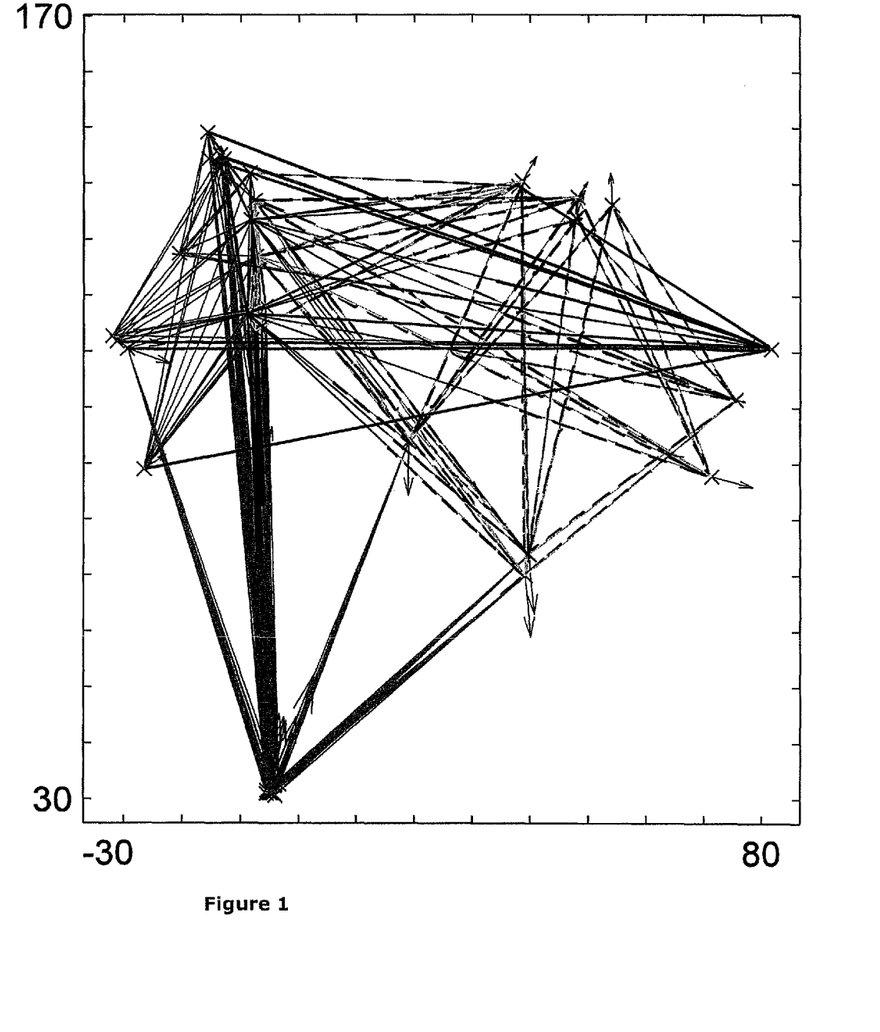
FIG. 1 is an exemplary illustration of detected moving objects, in one frame of a crowd formation sequence, as well as connections between object pairs for which the crowd formation relational primitives, are true.

FIG. 1 illustrates detected moving objects in one exemplary frame, in one embodiment of the present disclosure in which the desired group behavior is crowd formation, as well as connections between object pairs for which the crowd formation relational predicates, or primitives, are true. In FIG. 1, pairs of objects for which the crowd formation relation set holds are connected with solid (non-dashed) lines. The relation set was computed between all pairs of moving objects independently on each frame, one of which is illustrated in FIG. 1. As seen in FIG. 1, the relation induces a graph with the objects as nodes, and cliques in this graph satisfy the crowd activity model. This property can be used to detect instances of a modeled activity. The arrows shown in FIG. 1 as emanating from each node are velocity vectors. In this way, a viewer of FIG. 1 may see the direction and velocity of each node. The graph edges, thus the cliques, are formed based upon the orientation of the velocity vectors on each node relative to one another. In FIG. 1, the nodes with solid edges are moving towards each other, while the nodes with dashed edges are dispersing, i.e. moving away from one another.

The size of {O} may vary for a given activity model, even within the window $N_T$. Participating objects may be only intermittently detected and/or tracked, generating variability in {O}.

In the present disclosure, binary, relational semantic predicates may be used to model desired group behaviors. In one embodiment, one experimental domain for the methods and systems described in the present disclosure may be surveillance video, in which the group activities involve moving people and vehicles. Raw observables of moving objects may be provided by a moving object detector and tracker; and include location, spatial extent and velocity. Tracking may performed in the ground plane using a calibrated camera to achieve viewpoint independence.

In this embodiment, each relation may be computed on each time frame from the raw observables of any object pair $O_i$, and $O_j$, and return a value in {0,1} indicating the probability of the primitive being true. In this embodiment, a set or library of primitives, in one embodiment, may include: {moving-closer, moving-apart, close-to, next-to, facing-towards, facing-away, facing-same-direction, same-speed}.

The binary valued predicates may be obtained from continuous values in [0,1] by mapping them through a step function. The "close-to" predicate is time when the spatial distance $d_{ij}$ between $O_i$ and $O_j$ is significantly less than a parameter $D_{CT}$, and approaches zero after $d_{ij} > D_{CT}$, "next-to" is similar but with a smaller threshold, $d_{ij} < D_{NT}$ where $D_{CT} < D_{NT}$. "moving-closer" is defined using the (ground-plane) velocity vectors of two moving objects, it is time if the instantaneous velocities predict that the objects will be closer at time T+1 than they are at T. "facing-towards" is true if the velocity vectors and the line joining the objects are aligned, and becomes false as the angles diverge past π/2. "facing-same-direction" measures the degree to which the velocity vectors are aligned, and "same-speed" measures how close the velocity magnitudes are.

These primitives may be used to precisely specify activity models. The crowd formation model $A_{cf}$ may defined by the following relation set:

$$S_{cf} = \{\text{moving-closer, close-to facing-towards}\}. \quad (2)$$

Figure 2:
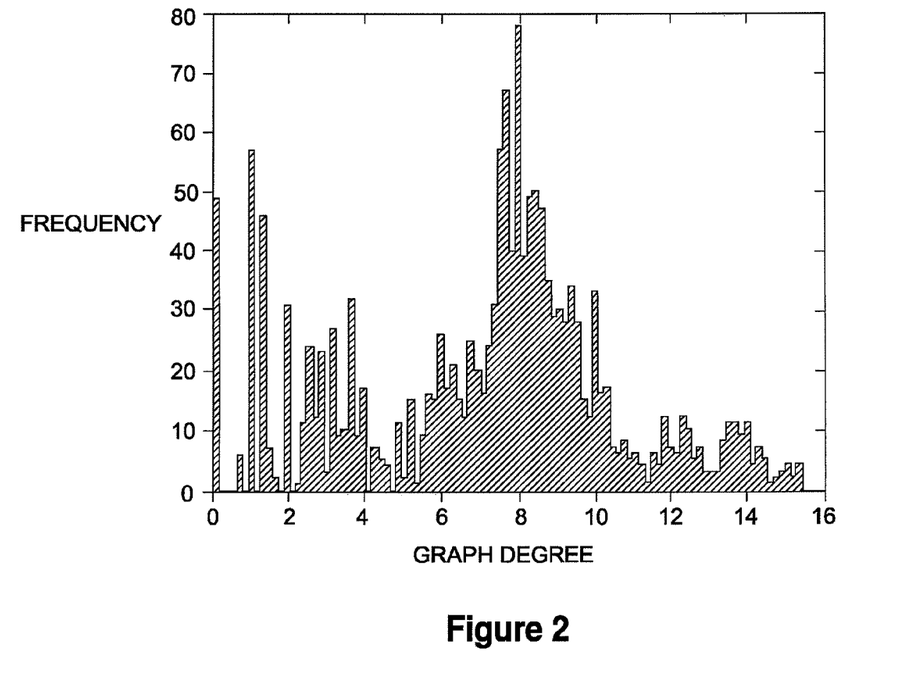
FIG. 2 shows a histogram of relational graph sizes for a crowd formation sequence, in one embodiment of the present disclosure.

Taken together, these relations may define a concept of two objects "approaching" one another. In aggregate, a set of people that are mutually approaching one another may form a crowd over time. FIG. 2 shows a histogram of relational graph sizes for a crowd formation sequence, in one embodiment of the present disclosure.

Similarly, crowd dispersal may be defined through an underlying concept of "departing". Many other intuitive concepts corresponding to high-level group behaviors can be defined this way, such as overtaking and fleeing Detection of group behavior of group activity may performed by computing all predicates over all object pairs on each frame. For each activity model $A_m$, the predicates may be combined by multiplying their likelihoods for each object pair, which induces a graph, or equivalently, a relation matrix, at each time T.

In one embodiment, relational clustering may then be used to identify groups of objects in approximate cliques at each T. In this embodiment, each clique may vote for its spatial location in a spatial accumulator array maintained over $N_T$ for each activity model. After non-maximal suppression, any location with sufficiently high probability may be determined to be the locus of an activity occurrence during $N_T$.

In one embodiment, given the pairwise relation values at a time instant, relational clustering is used to find cliques in the relation graphs, thereby indicating the presence or the modeled activity and which objects are participating in it.

More formally, at time t, a total of $M_t$ objects are observed. Each semantic relation $S_k(O_i, O_j, t,)$ generates an $M_t \times M_t$ symmetric matrix $R_{kt}$, where element $R_{kt}$ (i,j)=$S_k(O_i,O_j,t)$. With $N_S$ semantic predicates in the activity model $A_m$, this leads to $N_S$ relational matrices $\{R_{kt}\}_{k=1}^{N_S}$ at time instance t, all with the same dimensionality of $M_t \times M_t$. The problem is to find clusters of objects in this multi-dimensional graph.

Clearly, for multiple semantic relations $S_t$, to hold, the logical conjunction of the $R_t$ of the $R_{kt}$ yields the desired combination of binary weights. A logical disjunction of the $R_{kt}$, represents any of the relations holding between ($O_i$, $O_j$).

In one embodiment, spectral graph clique analysis is performed, in order to find the cliques in these graphs. In particular, an efficient approximate spectral technique is used to locate nodes with a high probability of membership in the largest clique. To find additional cliques, the nodes in the largest can be removed and the analysis recursively repeated.

Spectral clique algorithms tend to reverse the typical eigenvalue ordering since they look at the larger eigenvalues rather than the smaller ones. The basic idea is that the eigenvector of the second largest eigenvalue tends to have most of its weight on the largest clique in large random graphs. Since the eigenvalues are specified from largest to smallest, $\lambda_2$ is the second largest eigenvalue. For a clique of size k, and a matrix of size n, the relationship of $\lambda_2$,k and n has been shown to be:

$$\frac{k}{2} - \sqrt{\frac{n}{2}} \leq \lambda_2 \leq \frac{k}{2} + \sqrt{\frac{n}{2}}.$$

Furthermore, as k increases, $\lambda_2$ becomes much larger than the $\lambda_i$ for $i \geq 3$.

In one embodiment, a maximum clique detection algorithm is used. This algorithm selects the nodes represented by the k largest elements in the eigenvector of $R_t$, corresponding to $\lambda_2$. An efficient check may be made to ensure that the nodes selected are indeed neighbors of one another. In effect, these k nodes form a likely seed for the true clique. The value for k can be chosen heuristically based upon the site and weight of the matrix.

The cluster coefficient measures for each node how many neighboring nodes are connected. The cluster coefficient for a vertex $v_i$, is the proportion of links between the vertices within its neighborhood divided by the number of links that could possibly exist between them. For a directed graph, an edge $e_{ij}$ is distinct. from $e_{ji}$, and therefore for each neighborhood $N_i$ there arc $k_i$ ($k_i$−1) links that could exist among the vertices within the neighborhood, where $k_i = |N_i|$. Thus, the clustering coefficient is given as:

$$C_i = \frac{|\{c_{ij}\}|}{k_i(k_i - 1)} : v_j \in N_i.$$

The clustering coefficient for an entire graph is simply the average for each vertex:

$$C = \frac{1}{n} \sum_1^n C_i.$$

Figure 3:
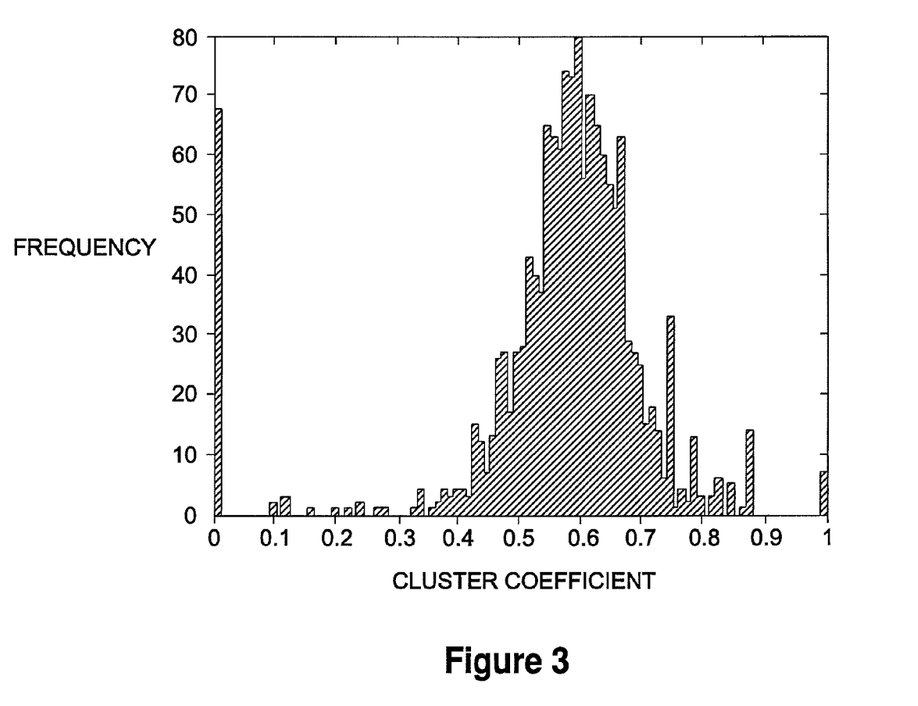
FIG. 3 shows a histogram of corresponding cluster coefficient values for the crowd formation sequence illustrated in FIG. 2.

FIG. 3 shows a histogram of corresponding cluster coefficient values for the crowd formation sequence illustrated in FIG. 2.

Figure 4A:
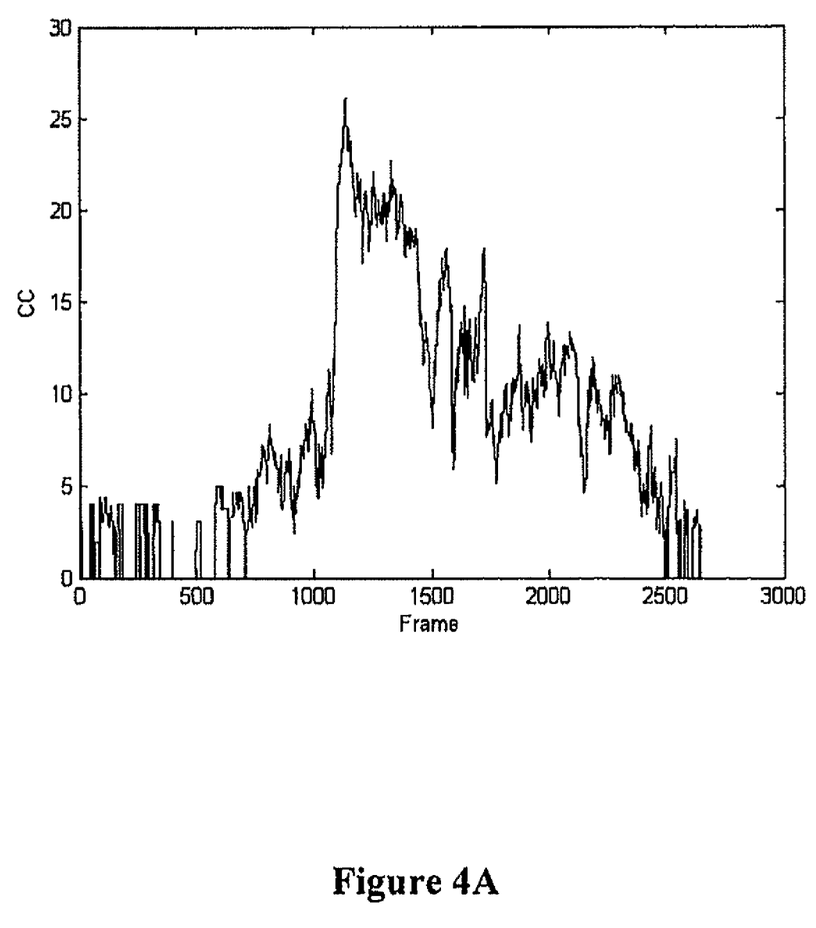
FIG. 4A illustrates a plot of the cluster coefficient weighted by graph size over the same sequence as shown in FIGS. 2 and 3.
Figure 4B:
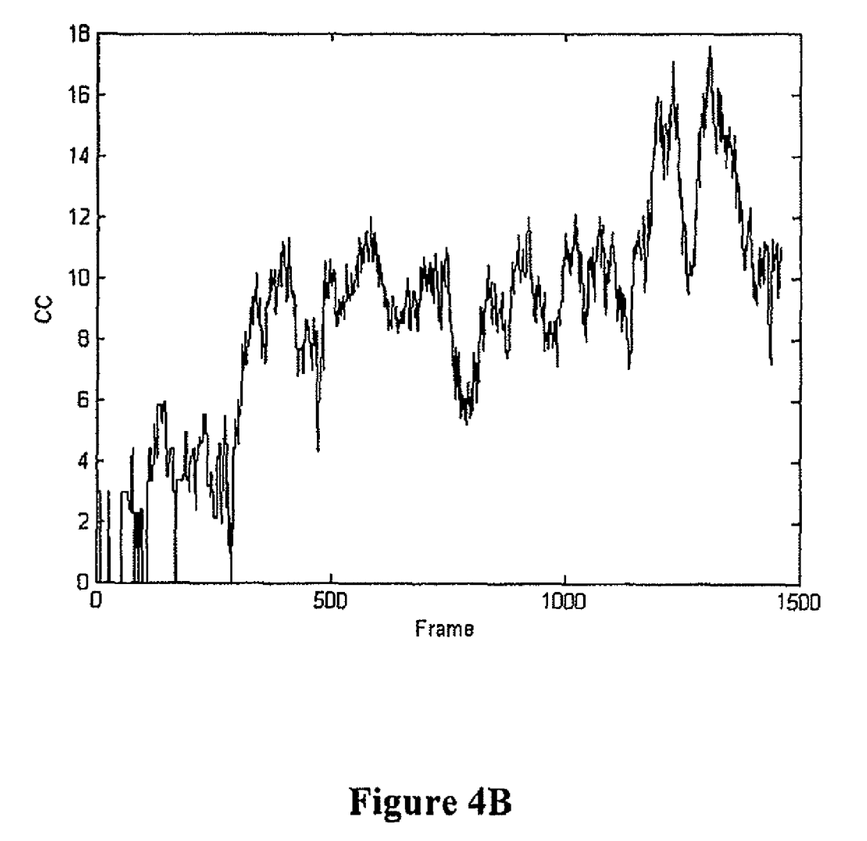
FIG. 4B illustrates a plot of the cluster coefficient weighted by graph size over a sequence different from the sequence shown in FIGS. 2 and 3.

FIG. 4A illustrates a plot of the cluster coefficient weighted by graph size over the same sequence as shown in FIGS. 2 and 3. FIG. 4B illustrates a plot of the cluster coefficient weighted by graph size over a sequence different from the sequence shown in FIGS. 2 and 3.

In both cases illustrated in FIGS. 4A and 4B, the peak values correspond to the maximum activity level of crowd formation. This provides empirical evidence that the conjunction of semantic relations for crowd formation can be used to extract cliques corresponding to the activity model.

In one embodiment, the agents or objects may be small autonomous robots. In this embodiment, the controller may cause each robot to communicate with its nearest neighbors through radio signals that allow the receiving robot to acquire a sense of the spatial direction of the robot that sent the radio signals. The controller may determine, from the radio signals received by a robot, whether that robot is substantially in plane with respect to its three or more nearest neighbors, or whether it is substantially out of plane with respect to its three or more nearest neighbors.

The controller may determine the presence of a high spatial frequency when a clique of robots are all out of plane with respect to each other, and wherein the controller is further configured to command the robots to draw closer to each other when such a high spatial frequency is detected.

When the swarm has reached a static state, and all robots have all communicated their relative positions to a "head-end" robot in communication with the outside world, an image of the shape of the object on which the swarm of robots is moving may be formed, in one embodiment of the present disclosure. Because of the induced swarm behavior, this image may be non-uniformly sampled, with a higher density of samples present in regions of high spatial frequency. In this way the number of robots required to represent a given shape may be minimized.

In this embodiment, an image may be formed of the shape of an object on which the swarm of robots is moving, when the swarm has reached a static state and all of the robots have communicated their relative positions to one of the robots that is in communication with the outside world. The processing system may include an image processor configured to process such an image. In particular, the processing system may be configured to perform non-uniform sampling of said image in order to extract information about the shape of said object.

Figure 5:
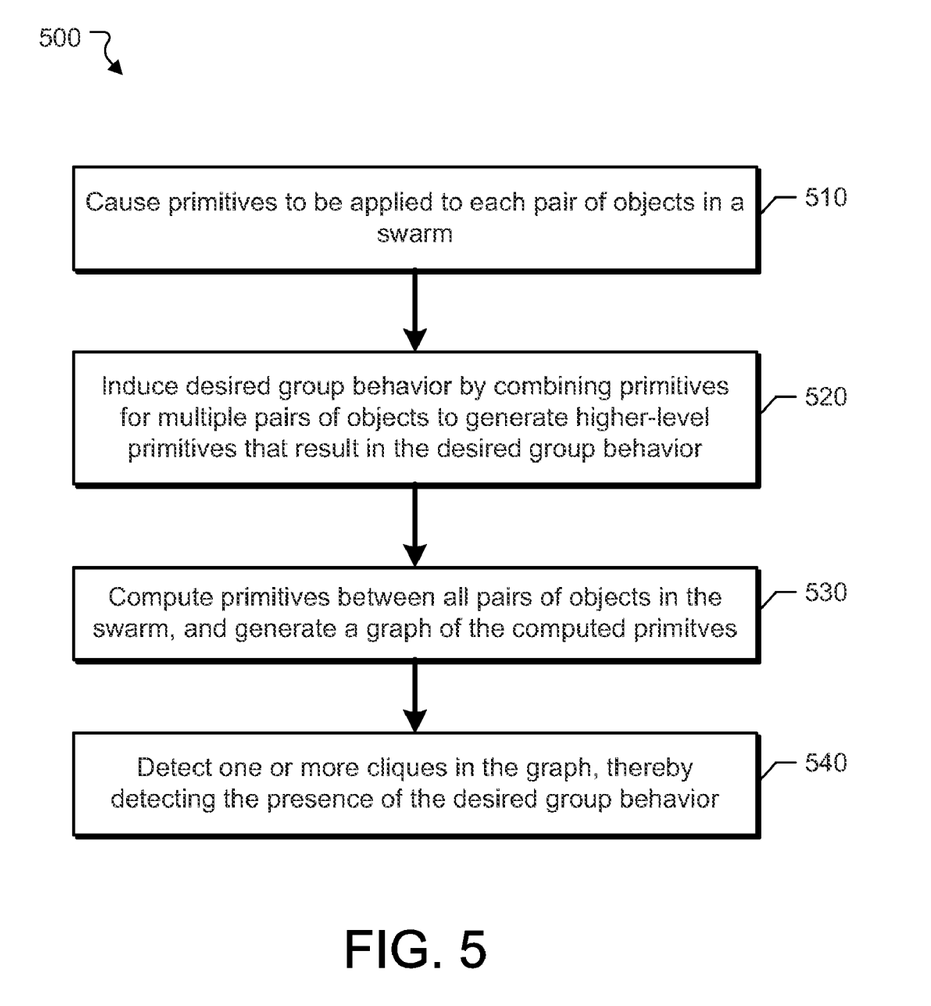
FIG. 5 is a schematic flow chart of a method of controlling a swarm, in accordance with one embodiment of the present disclosure.

FIG. 5 is a schematic flow chart of a method 500 of controlling a swarm by inducing and detecting desired group behavior, in accordance with one embodiment of the present disclosure. The method 500 may include an act 510 of causing one or more primitives to be applied to each pair of objects in the swarm, where each primitive is a local, pairwise relationship between a pair of the objects in the swarm. The method 500 may further include an act 520 of combining the primitives for multiple pairs of the objects to generate higher-level primitives that result in the behavior of the objects, thereby inducing the desired group behavior. The method 500 may further include an act 530 of computing the primitives between all the pairs of the objects in the swarm, and generating a graph of the computed primitives. The method 500 may further include an act 540 of detecting one or more cliques in the graph, thereby detecting a presence of the desired group behavior in the swarm.

In sum, methods and systems have been described for efficient, large-scale control of swarms. Applications of the swarm control systems and methods described in the present disclosure include, but are not limited to: controlling swarms of inspection units that can non-invasively inspect mechanical systems such as aircraft engines; detecting suspicious activity in video; and biological applications.

It should be noted that various changes and modifications to the embodiments described herein will be apparent to those skilled in the art. Such changes and modifications may be made without departing from the spirit and scope of the present disclosure and without diminishing its attendant advantages.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

What is claimed is:

1. A system for controlling a swarm that includes a plurality N of autonomous objects, the system comprising:
    a processing system configured to compute one or more primitives to be applied to pairs of objects in the swarm, and to combine the primitives for multiple of the pairs of the objects in order to generate higher-level primitives that can result in a desired group behavior of the objects;
    the processing system further configured to generate a graph of the computed primitives, and identify one or more cliques in the graph; wherein each primitive is a local, pairwise relationship between two objects in the swarm; and
    a controller configured to cause the one or more computed primitives to be applied between each pair of objects in the swarm, and to cause each object to maximize its respective set of primitives so as to induce the desired group behavior by the objects, the controller further configured to detect the desired group behavior in the swarm by monitoring the primitives computed by the processing system and the cliques identified by the processing system.

2. The system of claim 1,
    wherein the graph includes a plurality N of nodes, each node representing one of the objects, and wherein the edges in the graph represent the interactions between the nodes; and
    wherein each one of the cliques is a subset of the nodes in which the primitives hold between all pairs of the nodes in the subset, and all the nodes in the subset are connected to each other.

3. The system of claim 1, wherein the processing system is further configured to generate a mathematical activity model $A = (S, \{O\}, N_T)$ of the desired group behavior;

wherein A represents the mathematical activity model of the desired group behavior;

{O} represents a set of objects participating in the modeled activity, at all times t within a time interval defined by the relation: $t=T-N_T, \ldots, T$;

S represents a set $S=\{S_k(\cdot,\cdot,t)\}_{k=1}^{N_S}$ of $N_S$ primitives that hold true for the objects {O}; and wherein $$S_k(O_i, O_j, t) = 1 \quad \forall S_k \in S$$

$$\forall O_i, O_j \in \{O\}$$

$$t = T - N_T, \ldots, T,$$

and T is a current point in time.

4. The system of claim 3, wherein the processing system is further configured to generate an $M_t \times M_t$ relational matrix $R_{kt}$ from each primitive $S_k(O_i, O_j, t)$;

wherein the (i,j)th element of the matrix is defined by: $R_{kt}(i,j)=S(O_i,O_j,t)$, where $M_t$ represents a total number of objects observed at a time t; and wherein the processing system is further configured to generate $N_S$ relational matrices $\{R_{kt}\}_{k=1}^{N_S}$ at time instance t from a number $N_S$ of primitives in an activity model $A_m$, each of the $N_S$ relational matrices having a same dimensionality $M_t \times M_t$.

5. The system of claim 4, wherein the processing system is further configured to detect the cliques by performing relational clustering to find one or more clusters of objects in a multi-dimensional graph defined by said $N_s$ relational matrices $\{R_{kt}\}$.

6. The system of claim 3, wherein the processing system is further configured to detect the cliques by performing a spectral graph clique analysis.

7. The system of claim 6, wherein the processing system is further configured to perform the spectral graph clique analysis by selecting the nodes represented by the k largest elements in the eigenvector of $R_t$ corresponding to the second largest eigenvalue $\lambda_2$ of the relational matrices; and wherein for a clique of size k and a matrix of order n, $\lambda_2$ satisfies a mathematical relationship given by:

$$\frac{k}{2} - \sqrt{\frac{n}{2}} \leq \lambda_2 \leq \frac{k}{2} + \sqrt{\frac{n}{2}}.$$

8. The system of claim 3, wherein the processing system is further configured to compute the cliques of the graph by computing a cluster coefficient of the graph.

9. The system of claim 8, wherein the processing system is further configured to compute a cluster coefficient for a vertex $v_i$, using a mathematical formula given by:

$$C_i = \frac{|\{e_{ij}\}|}{k_i(k_i - 1)} : v_j \in N_i,$$

where $e_{ij}$ represents the (i,j)-th edge in the graph, and $N_i$ represents the i-th neighborhood in the graph; and wherein the cluster coefficient $C_i$ for a vertex $v_i$ is the proportion of links between the vertices within a neighborhood of the vertex $v_i$ divided by the total possible number of links between the vertices within that neighborhood.

10. The system of claim 3, wherein the processing system is further configured to compute a cluster coefficient for the graph by first computing a cluster coefficient for each vertex in the graph, then calculating an average of the cluster coefficients for everyone of the vertices in the graph; and wherein the cluster coefficient for each node indicates a number of neighboring nodes that are connected to that node.

11. The system of claim 3, wherein a set of the pairwise primitives comprise one or more of:
moving-closer;
moving-apart;
close-to;
next-to;
facing-towards;
facing-away;
facing-same-direction; and
same-speed.

12. The system of claim 11, wherein the desired group behavior comprises crowd formation; and wherein the processing system is further configured to generate an activity model $A_{cf}$ for crowd formation using a set $S_{cf}$ of primitives defined by:

$$S_{cf} = \{\text{moving-closer, close-to facing-towards}\}.$$

13. The system of claim 1, wherein the desired group behavior comprises at least one of: crowd formation; crowd dispersion; and a flow.

14. The system of claim 1, wherein the objects in the swarm comprise robots.

15. The system of claim 14, wherein the robots are configured to inspect mechanical systems.

16. The system of claim 14, wherein the controller is further configured to cause each of the robots to communicate with its nearest neighbors through radio signals that allow the receiving robot to acquire a sense of the spatial direction of the robot that sent the radio signals.

17. The system of claim 16, wherein the controller is further configured to determine, from the radio signals received by one of the robots, whether that robot is substantially in plane with respect to its nearest neighbors, or whether it is substantially out of plane with respect to its nearest neighbors.

18. The system of claim 17, wherein the controller is configured to determine the presence of a high spatial frequency when a clique of robots are all out of plane with respect to each other, and wherein the controller is further configured to command the robots to draw closer to each other when such a high spatial frequency is detected.

19. The system of claim 18, wherein the processing system includes an image processor configured to process an image of a shape of an object on which the swarm of robots is moving, said image being formed when the swarm has reached a static state and all of the robots have communicated their relative positions to one of the robots that is in communication with the outside world; and wherein the processing system is further configured to perform non-uniform sampling of said image in order to extract information about the shape of said object.

20. The system of claim 1, wherein at least some of the objects comprise fixed implanted agents whose locations are known.

21. A method of controlling a swarm that includes a plurality of autonomous objects, the method comprising:
inducing a desired group behavior of the objects, by causing one or more primitives to be applied to each one of the pairs of objects in the swarm, wherein each primitive is a local, pairwise relationship between a pair of the objects in the swarm, then combining the primitives for multiple of the pairs of the objects to generate higher-level primitives that result in the behavior of the objects; and detecting the desired group behavior by computing the primitives between all the pairs of the objects in the swarm, generating a graph of the computed primitives, and detecting one or more cliques in the graph so as to indicate a presence of the desired group behavior and to identify the objects that participate in the desired group behavior.

22. The method of claim 21, wherein the graph includes a plurality of nodes, each node representing one of the objects, wherein the edges in the graph represent the interactions between the nodes; and wherein each one of the cliques is a subset of the nodes in which the primitives hold between all pairs of the nodes in the subset, and all of the nodes in the subset are connected to each other.

23. The method of claim 21, wherein a mathematical representation of the desired group behavior comprises A=(S, {O}, $N_T$), wherein A represents a model of a group activity;

{O} represents a set of objects participating in the modeled activity, at all times t within a time interval of length $N_T$; and S represents a set $S=\{S_k(\cdot,\cdot,t)\}_{k=1}^{N_S}$ of $N_S$ primitives that hold true for the objects {O}; and wherein $$S_k(O_i, O_j, t) = 1 \quad \forall S_k \in S$$

$$\forall O_i, O_j \in \{O\}$$

$$t = T - N_T, \ldots, T,$$

and T is a current point in time.

24. The method of claim 23, wherein each primitive Sk(Oi, OJ, t,) generates an $M_t \times M_t$ symmetric matrix $R_{kt}$ whose (i,j)th element is defined by:

$R_{kt}(i, j) = S(O_i, O_j, t)$, where $M_t$ represents a total number of objects observed at a time t;

wherein a number $N_S$ of primitives in an activity model $A_m$ generates $N_S$ relational matrices $\{R_{kt}\}_{k=1}^{N_S}$ at a time point t, each relational matrix having a same dimensionality $M_t \times M_t$; and wherein the act of detecting the cliques comprises performing relational clustering by finding one or more clusters of objects in a multi-dimensional graph defined by Ns relational matrices $\{R_{kt}\}$.

25. The method of claim 23, wherein the act of detecting the cliques comprises performing a spectral graph clique analysis.

26. The method of claim 25, wherein the act of performing the spectral graph clique analysis comprises selecting the nodes represented by the k largest elements in the eigenvector of $R_t$, corresponding to $\lambda_2$; and wherein for a clique of size k and a matrix of size k, $\lambda_2$ satisfies a mathematical relationship given by:

$$\frac{k}{2} - \sqrt{\frac{n}{2}} \leq \lambda_2 \leq \frac{k}{2} + \sqrt{\frac{n}{2}}.$$

27. The method of claim 23, wherein the act of detecting the cliques of the graph comprises computing a cluster coefficient of the graph.

28. The method of claim 27, wherein the act of computing a cluster coefficient for the graph comprises computing a cluster coefficient for each vertex in the graph, then calculating an average of the cluster coefficients for everyone of the vertices in the graph; and wherein the cluster coefficient for each of the nodes indicates a number of neighboring nodes that are connected to that node.

29. The method of claim 28, wherein the cluster coefficient for a vertex $v_i$, is the proportion of links between the vertices within a neighborhood of the vertex $v_i$ divided by the total possible number of links between the vertices within the neighbor hood, and is defined mathematically by:

$$C_i = \frac{|\{e_{ij}\}|}{k_i(k_i - 1)} : v_j \in N_i,$$

where $e_{ij}$, represents the (i,j)-th edge in the graph, and $N_i$ represents the i-th neighborhood in the graph.

30. The method of claim 29, wherein the objects in the swarm comprise robots.

31. The method of claim 30, wherein at least some of the robots are configured to inspect one or more mechanical systems.

32. The method of claim 21, wherein the desired group behavior comprises at least one of: crowd formation; crowd dispersion; and a flow.

33. The method of claim 21, further comprising the act of implanting at least some fixed objects whose locations are known.

34. The method of claim 21, wherein the act of inducing the desired group behavior in the swarm comprises causing each of the objects in the swarm to maximize its respective set of primitives.

35. The method of claim 21, wherein the act of causing one or more primitives to be applied to each one of the N×N pairs of objects in the swarm comprises selecting the one or more primitives from a set of pairwise primitives that comprises:
moving-closer;
moving-apart;
close-to;
next-to;
facing-towards;
facing-away;
facing-same-direction; and
same-speed.

36. The method of claim 35, further comprising the act of causing each one of the robots to communicate with its nearest neighbors through radio signals that allows the receiving robot to acquire a sense of the spatial direction of the robotic device that sent the radio signals.

37. The method of claim 36, further comprising the act of determining, from the radio signals received by one of the robots from its neighbors, whether that robot is substantially in plane with respect to its nearest neighbors, or whether it is substantially out of plane with respect to its nearest neighbors.

38. The method of claim 37, further comprising the acts of:
determining the presence of a high spatial frequency when a clique of robots are all out of plane with respect to each other, and
causing the robots to draw closer to each other when such a high spatial frequency is detected.

39. The method of claim 38,
wherein an image is formed of a shape of an object on which the swarm of robots is moving, when the swarm reaches a static state and all of the robots have communicated their relative positions to one of the robots that is in communication with the outside world; and
further comprising the act of performing non-uniform sampling of the image of the shape of said object in order to extract information about the shape of said object.

* * * * *